US012627919B2

(12) United States Patent
Ho

(10) Patent No.: US 12,627,919 B2
(45) Date of Patent: May 12, 2026

(54) ROTATABLE HEADPHONE FOR RESTING ON USER'S NECK

(71) Applicant: Dongguan Pure Audio Technology Co., Ltd., Dongguan (CN)

(72) Inventor: Chun-Chun Ho, New Taipei (TW)

(73) Assignee: Dongguan Pure Audio Technology Co., Ltd., Dongguan (CN)

( * ) Notice: Subject to any disclaimer, the term of this patent is extended or adjusted under 35 U.S.C. 154(b) by 233 days.

(21) Appl. No.: 18/532,881

(22) Filed: Dec. 7, 2023

(65) Prior Publication Data

US 2025/0150745 A1 May 8, 2025

(30) Foreign Application Priority Data

Nov. 8, 2023 (CN) ........................ 202311488331.X

(51) Int. Cl.
*H04R 1/10* (2026.01)
*H04R 1/1025* (2026.01)

(52) U.S. Cl.
CPC ......... *H04R 1/1066* (2013.01); *H04R 1/1008* (2013.01); *H04R 1/1025* (2013.01); *H04R 1/1041* (2013.01); *H04R 1/105* (2013.01); *H04R 2460/13* (2013.01)

(58) Field of Classification Search
CPC .. H04R 1/1066; H04R 1/1008; H04R 1/1025; H04R 1/1041; H04R 1/105; H04R 2460/13; H04R 2201/025; H04R 5/0335; H04R 2201/10
See application file for complete search history.

(56) References Cited

U.S. PATENT DOCUMENTS 5,457,751 A * 10/1995 Such .................... H04R 1/1058 381/381
6,252,970 B1 * 6/2001 Poon ...................... H04R 1/105 181/129
6,490,362 B1 * 12/2002 Clegg .................... H04R 1/083 381/381

(Continued)

FOREIGN PATENT DOCUMENTS

CN 112188351 A * 1/2021 ........... H04R 1/1033
CN 214627310 U * 11/2021

(Continued)

*Primary Examiner* — Oyesola C Ojo
(74) *Attorney, Agent, or Firm* — ScienBiziP, P.C.

(57) ABSTRACT

A rotatable headphone includes a headphone core, an ear-hanging component, and a neck-hanging component. The headphone core configured to generate sound. The ear-hanging component configured to be worn around a user's ear, wherein the headphone core is connected to one end portion of the ear-hanging component. Another end portion of the ear-hanging component is connected to the neck-hanging component, the neck-hanging component includes a movable portion and a fixing portion, the movable portion is rotatably connected to the fixing portion, the ear-hanging component is connected to one end portion of the fixing portion away from the movable portion, the movable portion is configured to be worn around a back side of the user's neck, and the fixing portion is configured to be worn around a front side of the user's neck.

13 Claims, 3 Drawing Sheets

(56) References Cited

U.S. PATENT DOCUMENTS 6,603,863 B1 * 8/2003 Nagayoshi ........... H04R 1/1066 D14/206
7,245,737 B2 * 7/2007 Amae .................. H04R 1/1066 381/374
7,406,172 B2 * 7/2008 Amae .................. H04R 1/1066 381/381
8,767,996 B1 * 7/2014 Lin ......................... G06F 3/165 381/370
8,994,610 B2 * 3/2015 Tricoukes .............. G02B 7/002 361/679.03
10,154,334 B1 * 12/2018 Lin ........................ H04R 19/04
11,716,561 B2 * 8/2023 Li ........................ H04R 1/1066 381/380
2009/0185699 A1 * 7/2009 Kim ..................... H04R 1/1066 381/151
2009/0274335 A1 * 11/2009 Cheung ................ H04R 5/0335 381/374
2011/0110553 A1 * 5/2011 Logan .................. H04R 1/1058 381/380
2011/0170703 A1 * 7/2011 Palma .................. H04R 1/1041 381/74
2012/0027242 A1 * 2/2012 Son ...................... H04R 1/1033 381/380
2015/0146880 A1 * 5/2015 Boni .................... H04R 1/1008 381/74
2016/0193085 A1 * 7/2016 Jenkins ................ H04R 1/1083 181/129
2016/0381453 A1 * 12/2016 Ushakov ................. H04M 1/05 381/71.6
2017/0127167 A1 * 5/2017 Zheng .................. H04R 5/0335
2017/0230745 A1 * 8/2017 Petersén .............. H04R 1/1033
2017/0264984 A1 * 9/2017 Pelland ................ H04R 5/0335
2018/0302718 A1 * 10/2018 Jensen ................. H04R 1/1066
2019/0014425 A1 * 1/2019 Liao ..................... H04R 25/606
2019/0075389 A1 * 3/2019 Jan .......................... A42B 3/306
2019/0208308 A1 * 7/2019 Tews .................... H04R 5/0335
2020/0120410 A1 * 4/2020 Akaike ................ H04R 1/1016
2020/0389719 A1 * 12/2020 Morris ................. H04R 5/0335
2021/0014595 A1 * 1/2021 Li .......................... H04R 31/00
2021/0329366 A1 * 10/2021 Li ........................ H04R 1/1066
2021/0337287 A1 * 10/2021 Li .......................... H04R 9/025
2022/0239997 A1 * 7/2022 Karp .................... H04R 1/1008
2022/0400327 A1 * 12/2022 Wang ...................... H04R 1/105
2023/0370763 A1 * 11/2023 Wang ................... H04R 1/1008
2024/0022848 A1 * 1/2024 Lu .......................... H04R 1/105
2024/0147106 A1 * 5/2024 Goh ..................... H04R 1/1008
2024/0430611 A1 * 12/2024 Li ........................ H04R 1/1066

FOREIGN PATENT DOCUMENTS

JP 2009538030 10/2009
WO 2013125355 8/2013
WO WO-2013125355 A1 * 8/2013 ........... H04R 5/0335
WO 2015102117 7/2015

* cited by examiner

ROTATABLE HEADPHONE FOR RESTING ON USER'S NECK

FIELD

The subject matter herein generally relates to audio devices, and more particularly to a rotatable headphone capable for resting on user's neck for enhancing the user's experience.

BACKGROUND

Headphones are widely used in daily life. The headphone may include a neck-hanging component and two ear-hanging components connected to the neck-hanging component. The neck-hanging component may be rested around the user's neck, and the ear-hanging components are used to be rested around the user's ears.

However, a rigid connection between the neck-hanging component and the ear-hanging components prevents the neck-hanging component from be movably adjusted relative to the ear-hanging components. Thus, when the user lies down, the neck-hanging component may not adapt well to the user's neck, causing discomfort to the user.

BRIEF DESCRIPTION OF THE DRAWINGS

Implementations of the present disclosure will now be described, by way of embodiments, with reference to the attached figures.

DETAILED DESCRIPTION

Figure 1:
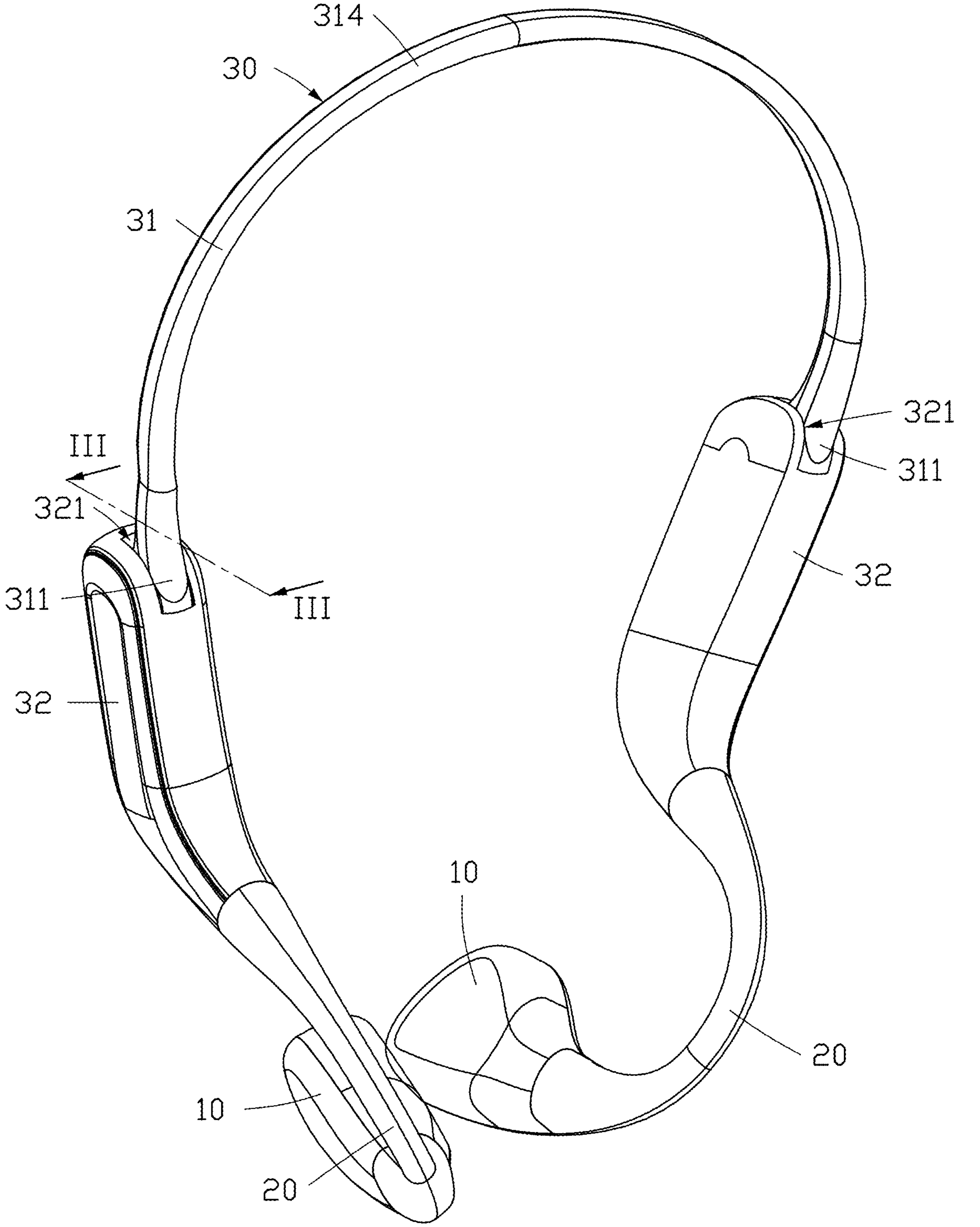
FIG. 1 is a diagrammatic view of a rotatable headphone according to an embodiment of this application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Referring to FIG. 1, an embodiment of the present application provides a rotatable headphone for resting on user's neck (hereinafter, "headphone 100"). The headphone 100 includes two headphone cores 10, two ear-hanging components 20, and a neck-hanging component 30. The neck-hanging component 30 includes two end portions. Each end portion of the neck-hanging component 30 connects to an end of a respective one of the ear-hanging components 20. Another end of each ear-hanging component 20 connects to a respective one of the headphone cores 10.

The neck-hanging component 30 is generally U-shaped. The neck-hanging component 30 matches a user's neck in shape. Each of the ear-hanging components 20 is generally n-shaped. The ear-hanging components 20 are designed to hang around the user's ears. The headphone cores 10 are generally spindle-shaped. The headphone cores 10 are positioned near the temples of the user, and can convert electrical signals into mechanical vibrations, thereby generating sound.

In some embodiments, the neck-hanging component 30 includes a movable portion 31 and two fixing portions 32. The movable portion 31 includes two ends. Each end of the movable portion 31 is rotatably connected to an end of a respective one of the fixing portions 32. Each ear-hanging component 20 is connected to another end of a respective one of the fixing portions 32 away from the movable portion 31. The movable portion 31 is used to be worn around the back side of the user's neck or other areas, while the fixing portions 32 are used to be worn the front side of the neck. Thus, when the user stands upright, the movable portion 31 can be worn around the back side of the user's neck. When the user lies down, the movable portion 31 can be rotated relative to the fixing portions 32 and then be worn around other parts of the human body (for example, the head), thereby reducing the pressure of the movable portion 31 applied on the back side of the user's neck and enhancing the comfort.

In some embodiments, each of the fixing portions 32 is generally a hollow box. The end of the fixing portion 32 connected to the movable portion 31 defines a slot 321. The movable portion 31 is generally U-shaped, and includes a rotatable body 311 at each of the ends connected to the fixing portion 32. The rotatable body 311 is inserted into the slot 321 and can rotate within the slot 321 by 0 degree to 90 degrees. In other embodiments, the slot 321 may be defined on the movable portion 31, and the rotatable body 311 is arranged on the fixing portion 32.

Figure 2:
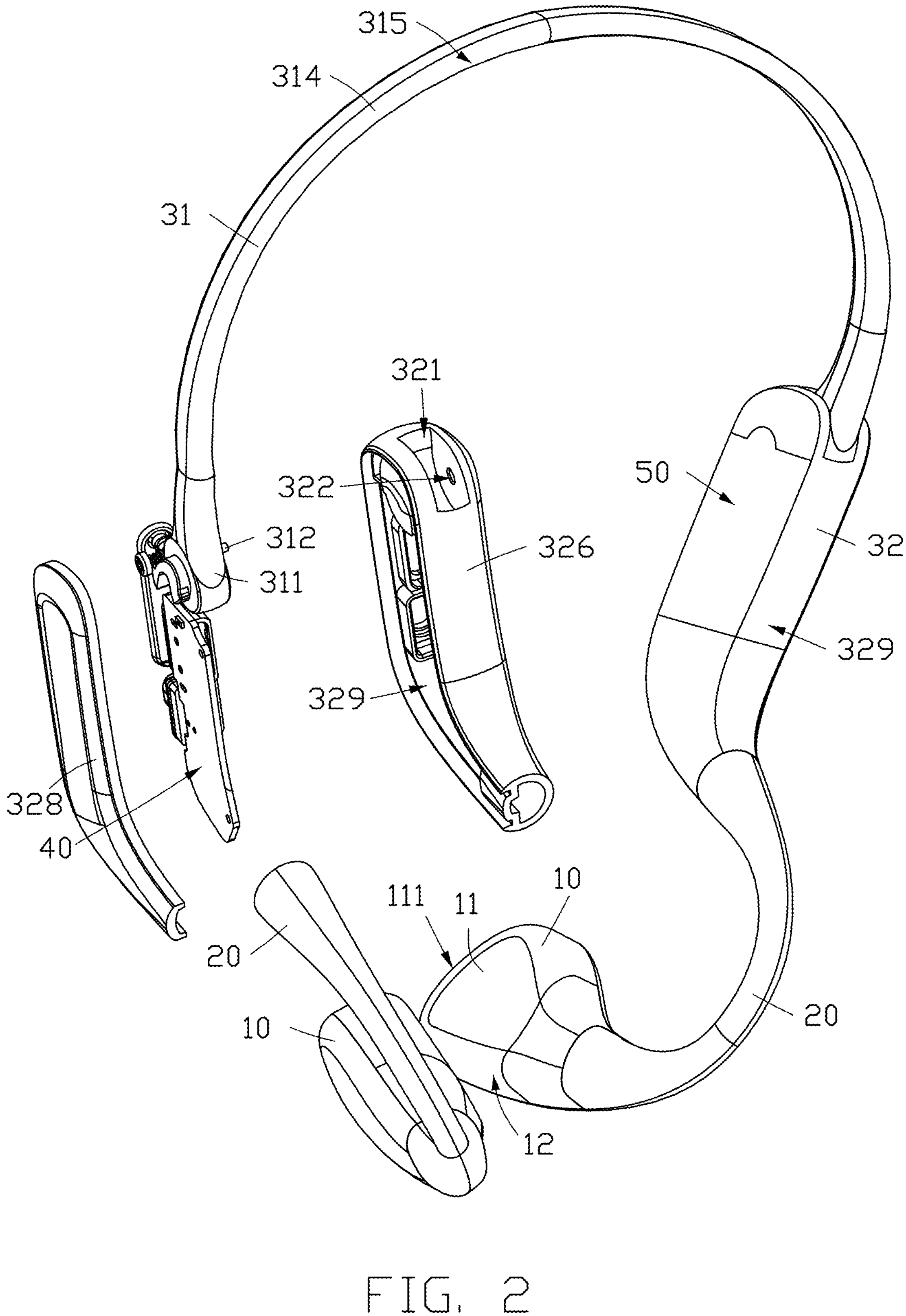
FIG. 2 is an exploded view of a fixing portion of the rotatable headphone in FIG. 1.
Figure 3:
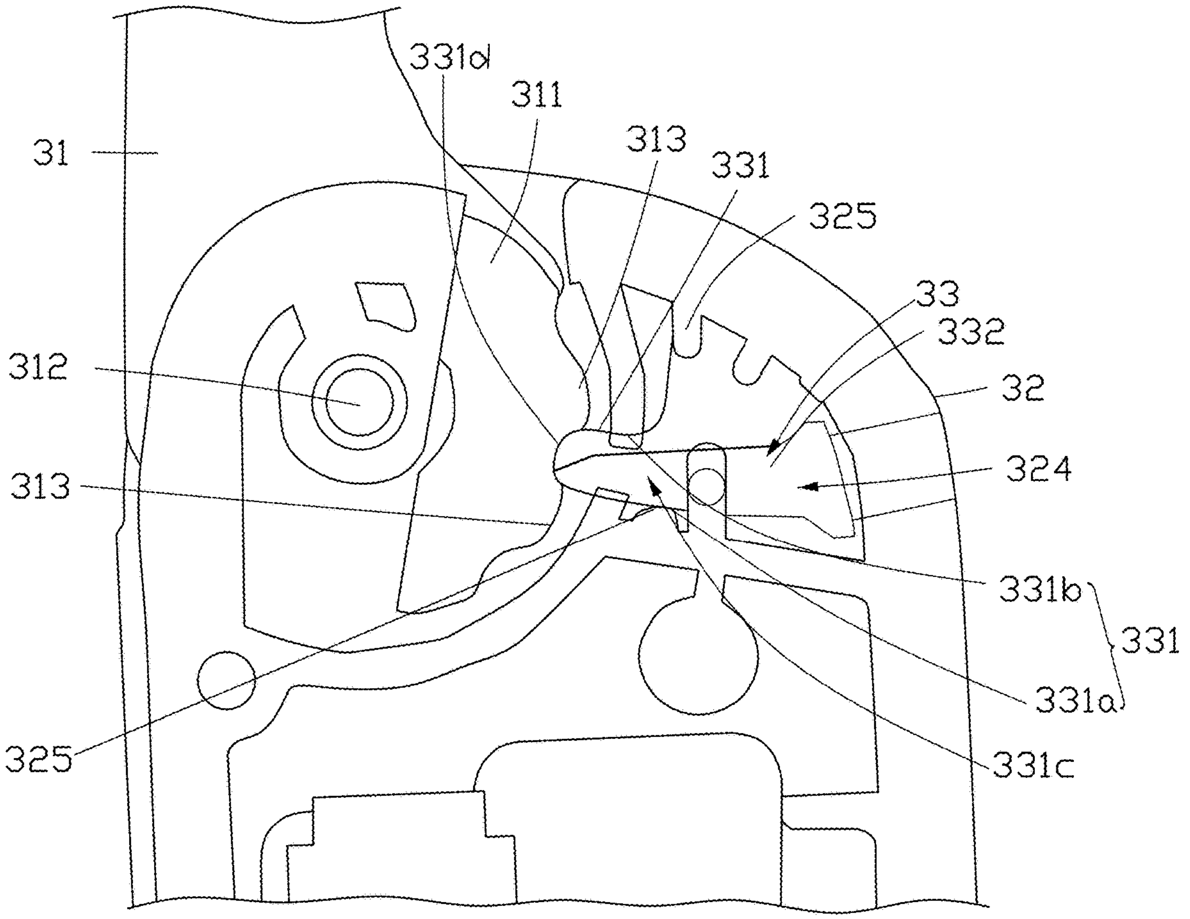
FIG. 3 is a partial cross-sectional view of the fixing portion along line III-III in FIG. 1.

Referring to FIGS. 2 and 3, in some embodiments, a central portion of the rotatable body 311 protrudes outward to form a shaft 312, and a sidewall of the slot 321 defines a hole 322. The shaft 312 is inserted into the hole 322 and can rotate relative to the hole 322. This design allows the rotatable body 311 to rotate within the slot 321 while preventing the rotatable body 311 from separating from the slot 321. In other embodiments, the engagement manner between the slot 321 and rotatable body 311 can also be changed.

In some embodiments, an edge of the rotatable body 311 is provided with a plurality of protrusions 313, which are spaced from each other and smoothly connected to the edge of the rotatable body 311. Each fixing portion 32 also include a blocking piece 33, which partially extends into the slot 321 and abuts against two of the plurality of protrusions 313, preventing the movable portion 31 from rotating due to its own weight.

In some embodiments, the blocking piece 33 includes an elastic member 331 and a fixing column 332. The elastic member 331 is generally n-shaped. The elastic member 331 includes a first portion 331*a* and a second portion 331*b* connected to the first portion 331_a_ at an intersection point 331_d_. The first and second portions 331_a_, 331_b_ are arranged at an acute angle, forming an accommodating space 331_c_ therebetween. One end of the fixing column 332 is fixed to the fixing portion 32, and the other end of the fixing column 332 inserts into the accommodating space 331_c_ and pushes the intersection point of first and second portions 331_a_, 331_b_ to abut against the two protrusions 313, thereby limiting the position of the elastic member 331. The material of the elastic member 331 can be stainless steel or Teflon.

In some embodiments, the fixing portion 32 includes a receiving slot 324, and multiple stopper 325 protrude from an inner surface of the receiving slot 324. The first portion 331_a_ and the second portion 331_b_ is clipped into the receiving slot 324. The stopper 325 limit the movement of the first portion 311_a_ and the second portion 331_b_, thereby securing the elastic member 331 within the receiving slot 324.

Referring FIG. 2, in some embodiments, the headphone 100 further includes an electronic control component 40 and a battery component 50. The electronic control component 40 is housed in one of the fixing portions 32, and the battery component 50 is housed in the other fixing portion 32. A wire tube 314 is provided within the movable portion 31 and connects the electronic control component 40 and the battery component 50 through wires 315. Each fixing portion 32 includes a box body 326 and a cover 328. The cover 328 covers the box body 326 to form a receiving space 329, within which the battery component 50 or the electronic control component 40 is housed. The electronic control component 40 includes components such as an audio amplifier chip, a digital-to-analog conversion chip, a Bluetooth module, a microphone, and a touch chip. The battery component 50 includes components such as a lithium-ion battery, a battery management chip, a charging interface, and a power switch. The battery component 50 is used to energize relative components of the headphone 100 and facilitating quick charging.

In some embodiments, the headphone core 10 includes a core casing 11 and a transducer 12. The core casing 11 connects to one end of the ear-hanging component 20 and is used to be in contact with the user's skin. The core casing 11 forms a housing cavity 111, and the transducer 12 is placed in the housing cavity 111 and connected to the core casing 11. When the user wears the headphone 100, the transducer 12 converts electrical signals into mechanical vibrations, which drives the core casing 11 that is in contact with the skin to produce mechanical vibrations. These vibrations are transmitted through the user's bones and nerves, allowing the user to hear the bone-conducted sound from headphone core 10. In this embodiment, the transducer 12 is a vibration motor.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A rotatable headphone comprising:

a headphone core configured to generate sound;

an ear-hanging component configured to be worn around an ear of a user, wherein the headphone core is connected to one end portion of the ear-hanging component; and a neck-hanging component, wherein another end portion of the ear-hanging component is connected to the neck-hanging component, the neck-hanging component comprises a movable portion and a fixing portion, the movable portion is rotatably connected to the fixing portion, the ear-hanging component is connected to an end portion of the fixing portion away from the movable portion, the movable portion is configured to be worn around a back side of a neck of the user, and the fixing portion is configured to be worn around a front side of the neck;

the fixing portion defines a slot, the movable portion comprises a rotatable body, the rotatable body is insertable into the slot, and the rotatable body is rotatable in the slot;

an edge of the rotatable body is provided with a plurality of protrusions, the fixing portion further comprises a blocking piece, the blocking piece partially extends into the slot, and is configured to abut against two of the plurality of protrusions;

the blocking piece comprises an elastic member and a fixing column, the elastic member comprises a first portion and a second portion connected to the first portion at an intersection point, the first and the second portions cooperatively form an accommodating space, one end of the fixing column is fixed to the fixing portion, another end of the fixing column is insertable into the accommodating space and configured to push the intersection point to abut against the two protrusions which the blocking piece is abutting.

2. The rotatable headphone of claim 1, wherein the rotatable body is rotatable in the slot in a range between 0 degree to 90 degrees.

3. The rotatable headphone of claim 1, wherein a central portion of the rotatable body protrudes outward to form a shaft, a sidewall of the slot defines a hole, the shaft is insertable into the hole, and the shaft is configured to rotate in the hole.

4. The rotatable headphone of claim 1, wherein the elastic member is made of stainless steel or Teflon.

5. The rotatable headphone of claim 1, wherein the fixing portion comprises a receiving slot and a plurality of stoppers protruding from an inner surface of the receiving slot, the first and the second portions of the elastic member are in the receiving slot, and the plurality of stoppers is configured to limit a movement of the first and the second portions.

6. The rotatable headphone of claim 1, the rotatable headphone further comprising two fixing portions and two movable portions, wherein the two fixing portions are respectively positioned at either end portions of the movable portion.

7. The rotatable headphone of claim 6, further comprising an electronic control component and a battery component, wherein the electronic control component is housed in one of the two fixing portions, and the battery component is housed in another one of the two fixing portions.

8. The rotatable headphone of claim 6, further comprising wires, wherein the movable portion further comprises a wire tube configured for receiving the wires, and the electronic control component and the battery component are electrically connected to each other through the wires.

9. The rotatable headphone of claim 6, wherein each of the two fixing portions comprises a box body and a cover, the cover covers the box body to form a receiving space, and the battery component and the electronic control component are received in the receiving space.

10. The rotatable headphone of claim 7, wherein the electronic control component comprises a Bluetooth module.

11. The rotatable headphone of claim 7, wherein the battery component comprises a lithium-ion battery.

12. The rotatable headphone of claim 1, wherein the headphone core is configured to convert electrical signals into mechanical vibrations.

13. The rotatable headphone of claim 12, wherein the headphone core comprises a core casing and a transducer, the core casing connects to one end of the ear-hanging component and is configured to be in contact with skin of the user, the core casing defines a housing cavity, the transducer is placed in the housing cavity and connected to the core casing, and the transducer is configured to convert the electrical signals into the mechanical vibrations.

* * * * *